(12) United States Patent
Arikawa et al.

(10) Patent No.: US 6,967,919 B2
(45) Date of Patent: Nov. 22, 2005

(54) METHOD AND APPARATUS FOR OPTICAL HEAD AND OPTICAL INFORMATION REPRODUCING

(75) Inventors: Kouji Arikawa, Tokyo (JP); Shigeru Nakamura, Tokyo (JP); Kazuo Shigematsu, Tokyo (JP)

(73) Assignee: Hitachi, Ltd.

( * ) Notice: Subject to any disclaimer, the term of this patent is extended or adjusted under 35 U.S.C. 154(b) by 0 days.

(21) Appl. No.: 10/731,599

(22) Filed: Dec. 8, 2003

(65) Prior Publication Data

US 2004/0120245 A1 Jun. 24, 2004

Related U.S. Application Data

(63) Continuation of application No. 09/644,246, filed on Aug. 22, 2000, now Pat. No. 6,714,506.

(30) Foreign Application Priority Data

Nov. 18, 1999 (JP) .............................................. 11-327750

(51) Int. Cl.⁷ ................................................. G11B 7/00
(52) U.S. Cl. ................ 369/121; 369/112.01; 369/44.37
(58) Field of Search ...................... 369/112.01, 112.02, 369/44.37, 120, 121, 44.23, 44.24, 122, 44.41

(56) References Cited

U.S. PATENT DOCUMENTS 5,696,749 A * 12/1997 Brazas et al. .......... 369/112.09
5,875,167 A    2/1999 Katayama

FOREIGN PATENT DOCUMENTS

JP    09-274730 A    10/1997
JP    11-306581 A    11/1999

* cited by examiner

*Primary Examiner*—Nabil Hindi
(74) *Attorney, Agent, or Firm*—Townsend and Townsend and Crew LLP

(57) ABSTRACT

An optical head for reproducing information contained on an optical information disk includes a plurality of light sources and a plurality of light receiving elements in correspondence with the plurality of laser light sources. There is constructed a constitution in which one laser light source in the plurality of laser light sources is constituted by an individual laser diode and which includes a laser module constituted by other laser light sources and the plurality of light receiving elements to thereby enable to realize the small size of the optical head.

13 Claims, 4 Drawing Sheets

Optical path in DVD and CD

Optical path in DVD and CD

Optical path in high density DVD

Optical path in DVD

Optical path in CD-R

METHOD AND APPARATUS FOR OPTICAL HEAD AND OPTICAL INFORMATION REPRODUCING

CROSS REFERENCE TO RELATED APPLICATIONS

The present application is a continuation application of U.S. application Ser. No. 09/644,246, filed Aug. 22, 2000, now U.S. Pat. No. 6,714,506 which in turn claims priority from Japanese Patent Application No. 11-327750, filed on Nov. 18, 1999.

BACKGROUND OF THE INVENTION

The present invention relates to a laser module for processing optical information to record or read information recorded in an optical recording medium such as an optical disk or an opto-magnetic disk by using laser light, and more particularly to a laser module dealing with a plurality of wavelengths such as combination of DVD and CD as well as an optical head and an optical information recording and reproducing apparatus using the same.

In recent years, DVD (Digital Versatile Disc) having a recording density seven times as much as that of CD, starts spreading rapidly in the form of two wave corresponding drive by which a conventional CD can also be used. In order to maintain compatibility between DVD and CD, the optical head used in the drive is provided with laser modules, collimate lenses and object lenses respectively exclusive for CD and DVD, which increases the number of parts, complicates optical adjustment and gives rise to an increase in the cost.

In the meantime, development of blue laser having a wavelength of 410 nm becomes active and putting to practice thereof in the near future is expected. Therefore, from now on, it is necessary to conceive an optical head in correspondence with three wavelengths which is compatible with CD and DVD and can deal with also blue laser. However, when parts are assembled in correspondence with each of three wavelengths, it is anticipated that reduction in size and thin size formation of the apparatus become difficult and complicated optical adjustment results in a considerable increase in cost.

As a constitution in correspondence with reduction in size of an optical head for multiple wavelengths and promotion of reliability thereof, for example, in Japanese Patent Laid-Open No. Hei 10-21577, there is disclosed an example in which two or three semiconductor laser chips are pasted on a silicon substrate having a micromirror and light receiving elements to thereby constitute a module.

However, in the case in which two semiconductor laser chips are arranged, when one of the chips is aligned to an optical axis, the other of the chips becomes out of the optical axis and therefore, it is necessary to provide means for correcting chromatic aberration. Further, in the case in which three laser chips are integrated to a silicon substrate having light receiving elements, it is necessary to correct chromatic aberration of two pieces of laser light out of the optical axis. However, a burden on a polarizing diffraction grating or a focus lens becomes considerable and it is difficult to use the constitution into practice as the optical head. Further, an area of the silicon substrate having the three laser chips and the light receiving elements in correspondence with respective light sources, becomes large-sized, resulting in hindrance for reduction in size and price of the laser module.

For example, there is shown a silicon substrate arranged with three laser chips having a chip width of 0.25 mm in FIG. 4. A width of a recess portion (hereinafter, referred to as sink portion) on the substrate arranged with the chips becomes as large as 1.1 mm. Further, when light receiving elements for focusing and for tracking in correspondence with respective laser light are arranged on opposite sides of the sink portion, the width of the silicon substrate becomes as large as about 3.9 mm and the number of silicon substrates taken from a silicon wafer decreases and the constitution becomes expensive. In the meantime, it is extremely difficult to bond three laser chips in one silicon substrate proximately to each other since a material of a device of semiconductor laser having a wavelength of 410 nm is GaN and a material of a device of DVD or CD laser is GaAs which is different from GaN.

SUMMARY OF THE INVENTION

According to an aspect of the present invention, there is provided an optical head including a plurality of laser light sources and a plurality of light receiving elements in correspondence with the plurality of laser light sources, said optical head comprising: one laser light source of the plurality of laser light sources, formed as an individual laser diode; and a laser module comprising laser light sources other than the one laser light source of the plurality of laser light sources and the plurality of light receiving elements; wherein laser light emitted from the plurality of laser light sources is made to pass through a beam splitter and is guided to an optical information medium, and the reflected light from the optical information medium is guided to the laser module by the beam splitter.

According to another aspect of the present invention, there is provided the optical head according to the above-described aspect wherein the laser module includes two wave laser light sources, an optical axis of the laser light of the laser module is aligned with that of the laser light of the laser diode by the beam splitter, the laser light is collimated into parallel light by a collimator lens and then focused on the optical information medium by a focus lens, and the reflected laser light is guided to the light receiving elements in the laser module via a polarizing diffraction grating and the beam splitter.

Further, according to another aspect of the present invention, there is provided the optical head according to the above-described aspect wherein the laser module includes one wave laser light source.

Further, according to another aspect of the present invention, there is provided the optical head according to the above-described aspect wherein a beam shaping prism is arranged between the laser diode and the beam splitter.

Further, according to another aspect of the present invention, there is provided an optical head including a plurality of laser light sources and a plurality of light receiving elements in correspondence with the plurality of laser light sources, said optical head comprising: a laser module in which at least one laser light source of the plurality of laser light sources is pasted on a substrate having the plurality of light receiving elements as a laser chip; and laser light sources other than said at least one laser light source of the plurality of laser light sources, formed as individual laser diodes; wherein laser light emitted from the plurality of laser light sources is made to pass through a beam splitter and is guided to an optical information medium, and the reflected light from the optical information medium is guided to the light receiving elements in the laser module by the beam splitter.

Further, according to another aspect of the present invention, there is provided the optical head according to the above-described aspect wherein the laser diodes include two wave laser light sources, the laser module includes one wave laser light source, an optical axis of the laser light of one of the laser diodes is aligned with that of the laser light of the laser module by the beam splitter, the laser light is collimated into parallel light by a collimator lens and then focused on the optical information medium by a focus lens, and the reflected laser light is converted into primary diffraction light by a polarizing diffraction grating to be guided to the light receiving elements in correspondence with three laser light sources in the laser module via the beam splitter.

Further, according to another aspect of the present invention, there is provided an optical information recording and reproducing apparatus comprising: the optical head according to any one of Claims 1 through 6; optical information medium determining means; and light source selecting means; wherein laser light sources are selected by the light source selecting means in accordance with a result of determination of the optical information medium determining means.

BRIEF DESCRIPTION OF THE DRAWINGS

Aspects, advantages and novel features of the present invention will become apparent from the following description of the invention presented in conjunction with the accompanying drawings, wherein.

DESCRIPTION OF THE SPECIFIC EMBODIMENTS

Figure 1:
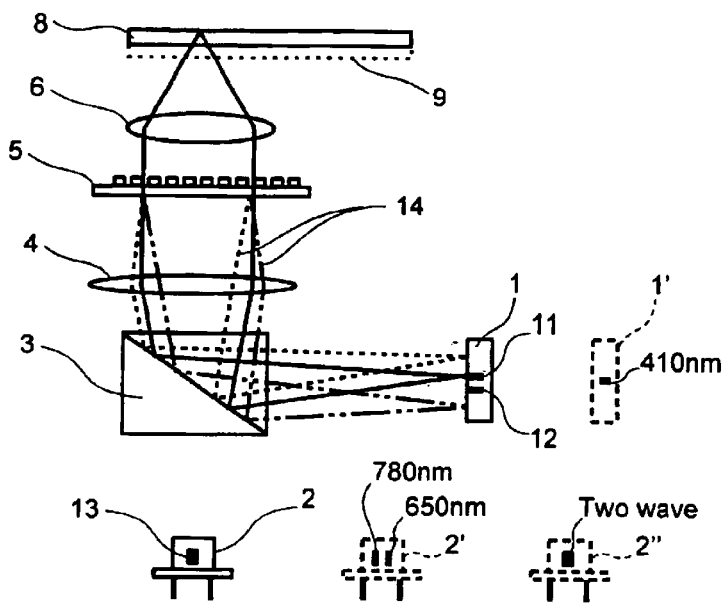
FIG. 1 is a view showing a constitution of an optical head having three wavelengths light sources according to the present invention, illustrating the optical path for DVD and CD formatted optical disks.
Figure 2:
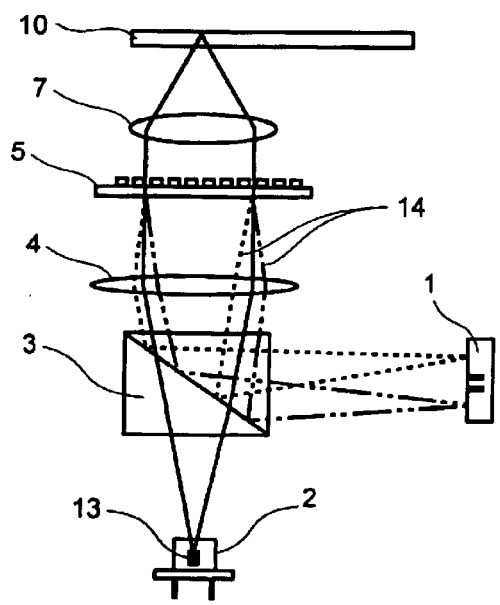
FIG. 2 illustrates the optical path of the constitution shown in FIG. 1 for a high density DVD formatted optical disk.

FIGS. 1 and 2 show a first constitution of an embodiment of an optical head according to the present invention, in which FIG. 1 shows an optical path during reproducing or recording and reproducing DVD-ROM, RAM (wavelength of 650 nm) or CD, CD-R (wavelength of 780 nm) and FIG. 2 shows an optical path during reproducing or recording and reproducing high density DVD (wavelength of 410 nm).

In FIG. 1, when the optical head is used for DVD-ROM, RAM, laser light emitted from a semiconductor laser chip 11 having a wavelength of 650 nm in a laser module 1 is reflected by a beam splitter 3, the reflected light is collimated into parallel rays by a collimator lens 4, and is focused on a record face of an optical disk 8 having a thickness of 0.6 mm of DVD by a focus lens 6.

When the optical head is used for CD, CD-R, laser light emitted from a semiconductor laser chip 12 having a wavelength of 780 nm in the laser module 1 is reflected by the beam splitter 3, the reflected light is collimated into parallel rays by the collimator lens 4, and is focused on an optical disk 9 having a thickness of 1.2 mm of CD by the focus lens 6.

In this case, correction of a focus position owing to a difference between plate thicknesses of DVD and CD is carried out by the focus lens and when light is converged to the optical disk 8 having a thickness of 0.6 mm of DVD, the correction is constituted to minimize primary side lobe and with regard to the optical disk 9 having a thickness of 1.2 mm of CD-R, the correction is carried out such that only inner peripheral light is used.

Figure 3:
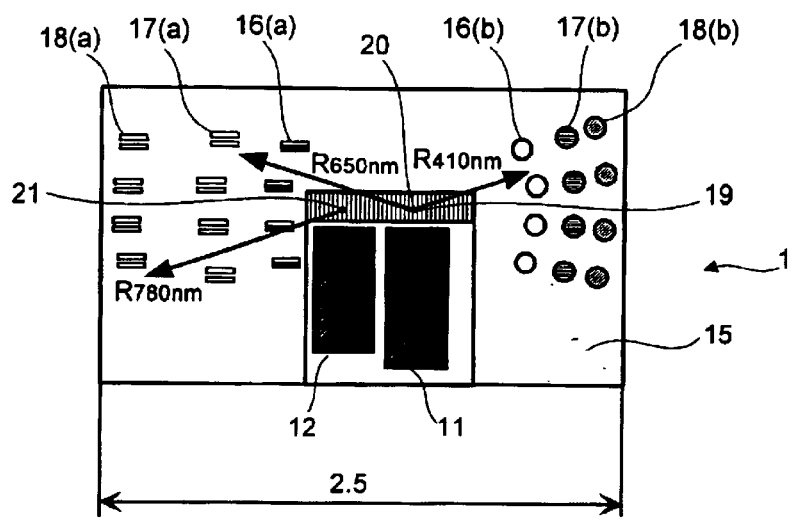
FIG. 3 is a view showing an embodiment of a laser module in FIGS. 1 and 2.

In the meantime, correction of chromatic aberration caused since the laser chip 12 of 780 nm is arranged out of an optical axis is made to cope with by the aspherical shape of the focus lens 6. Reflected light from the optical disk 8 or 9 passes through the focus lens 6 to be formed into primary diffracted light by the polarizing diffraction grating 5. The primary diffracted light formed falls on the collimator lens 4, is reflected by the beam splitter 3 and thereafter enters a light receiving element substrate 15 in the laser module 1 as can be seen in FIG. 3. Further, reflected light from the optical disk 8 or 9 is converted into an electric signal and is outputted in the respective light receiving elements.

FIG. 2 shows an optical path of high density DVD (having a wavelength of 410 nm). In the case of a laser diode 2, laser light emitted from a semiconductor laser chip 13 having a wavelength of 410 nm passes through the beam splitter 3, collimated into parallel rays by the collimator lens 4 and is focused on an optical disk 10 for high density DVD by a specific focus lens 7. Further, reflected light from the optical disk 10 passes through the focus lens 7 to be formed into the primary diffracted light 14 by the polarizing diffraction grating 5. The primary diffracted light 14 falls on the collimator lens 4, reflected by the beam splitter 3 and thereafter enters the light receiving elements on the light receiving element substrate 15 provided in the laser module 1 to be converted into an electric signal and then to be outputted.

FIG. 3 shows an embodiment of the light receiving element substrate 15 mounted with the laser chips 11 and 12. According to the light receiving element substrate, the focusing error and the tracking error are detected independently from each other for three wavelengths of 410 nm, 650 nm and 780 nm. In this case, focusing operation is carried out by the Knife Edge method and the tracking operation is carried out by the Differential Phase Detection method.

On the left side of the laser chip portion of the light receiving element substrate 15, there are arranged light receiving elements for tracking and for detecting a signal, having constitutions of 16(*a*), 17(*a*) and 18(*a*) for wavelengths of 410 nm, 650 nm and 780 nm, while on the right side of the laser chip portion of the light receiving element substrate 15, there are arranged light receiving elements for detecting focus, having constitutions of 16(*b*), 17(*b*) and 18(*b*) for wavelengths of 410 nm, 650 nm and 780 nm. The laser chip 11 having a wavelength of 650 nm and the laser chip 12 having a wavelength of 780 nm adopt a junction down structure in which emitting portions thereof are disposed at lower positions to ensure heat radiation. The laser chips 11 and 12 are bonded on a recess portion (sink portion) of the light receiving element substrate 15. Further, there is constituted a structure in which emitted light from the respective laser is reflected by a micromirror 19 utilizing an inclined face of the recess portion and the reflected light vertically rises from the light receiving element substrate 15. A rise point of the laser light on the micromirror 19 is referred to as an "apparent light emitting point".

When a distance from an apparent light emitting point 20 of laser light having a wavelength of 650 nm to the light receiving element portion 17(*a*) for detecting focus of laser light having a wavelength of 650 nm or to the light receiving element 17(*b*) for tracking and detecting a signal, is designated by notation R650 and a distance from an apparent light emitting point 21 of laser light having a wavelength of 780 nm to the light receiving element portion 18(a) for detecting focus having a wavelength of 780 nm or to the light receiving element 18(b) for tracking and detecting a signal, is designated by notation R780, a relationship (1) is expressed in association with a pitch "p" of the polarizing diffraction grating 5, a laser wavelength "λ" and a focal length $F_c$ of the collimator lens 4:

$$R = \frac{F_c \Box \lambda}{p}, \quad \text{where} \tag{1}$$

$F_c$ is the focal length of the collimator lens;
λ is the semiconductor laser wavelength; and
p is the polarizing diffraction grating pitch.

According to the embodiment, R=929 μm when Fc=20 mm, p=14 μm and the wavelength is 650 nm and R=1114 μm when the wavelength is 780 nm. The light emitting point of the laser light having a wavelength of 410 nm coincides with the light emitting point 20 of the laser light having a wavelength of 650 nm, the distance R=586 μm and the width of the light receiving element substrate 15 falls in a range equal to or smaller than 2.5 mm.

Figure 4:
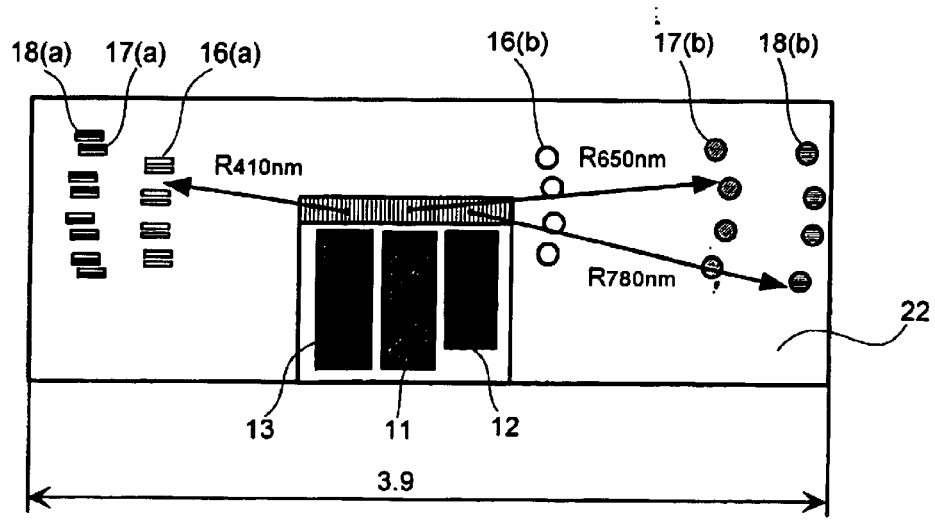
FIG. 4 is a view showing an of a laser module when three wavelength light sources are aligned.

FIG. 4 shows a prior art constitution of a light receiving element substrate where three laser chips are arranged in order to compare the size of the light receiving element substrate 15 therewith. A width of the light receiving element substrate 22 needs 3.9 mm, an area of the light receiving element substrate is increased by 50% or more and the number of the elements taken from a wafer is considerably reduced, which gives rise to an increase in cost. Further, two pieces of the laser light of the laser chip 11 having a wavelength of 780 nm and the laser chip 13 having a wavelength of 410 nm are arranged out of the optical axis and correction of chromatic aberration is needed. However, after all, the correction cannot be made to cope with only by the aspherical shape of the focus lens. Further, in consideration of a technical difficulty of arranging and bonding three chips with high accuracy and severeness of yield with regard to function after mounting the respective semiconductor laser chips on the silicon substrate, advantages in view of the cost provided by the embodiment are enormous.

Although according to the above-described constitution shown in FIG. 3, the laser module 1 is mounted with two of the semiconductor laser chips having a wavelength of 780 mm and a wavelength of 650 nm, when the laser chips having a wavelength of 780 nm and a wavelength of 650 nm are incorporated in a single semiconductor laser chip, fabrication of the laser chip to the silicon substrate is facilitated and further merit in view of the cost is achieved.

In the meantime, it is possible that the laser diode 2 is mounted with two semiconductor laser chips having a wavelength of 780 nm and a wavelength of 650 nm (shown in FIG. 1 by phantom lines as 2') or mounted with the above-described two wave semiconductor laser chip (shown in FIG. 1 by phantom lines as 2"), and the laser module 1 is mounted with the laser chip having a wavelength of 410 nm (shown in FIG. 1 by phantom lines as 1').

Further, a whole optical information recording apparatus has determining means for CD, DVD, and high density DVD disk, laser having wavelengths of 780 nm, 650 nm or 410 nm is selected by using laser light source selecting means in accordance with a result of the determination, and an optimum light source is made to emit light to thereby carry out information recording.

Figure 5:
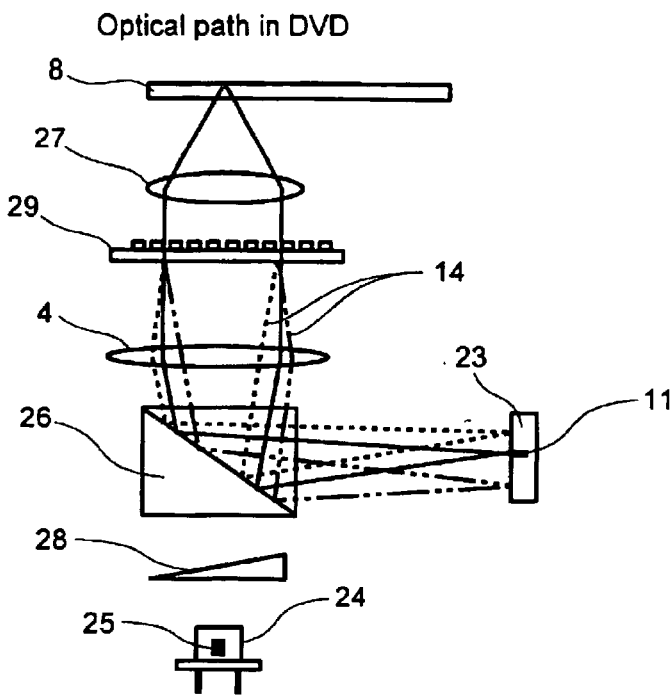
FIG. 5 is a view showing a constitution of an optical head having two wavelength light sources according to the present invention.
Figure 6:
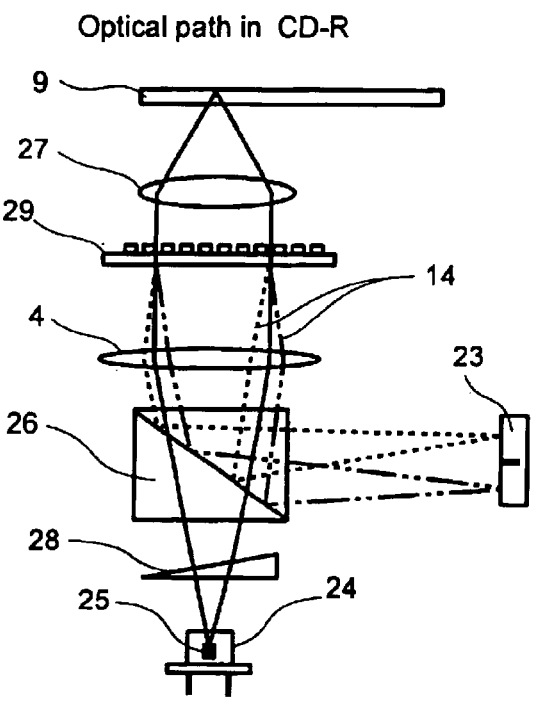
FIG. 6 is a view showing the constitution of the optical head having the two wavelength light sources according to the present invention.

Next, FIGS. 5 and 6 show a second constitution of an embodiment of an optical head according to the present invention, showing an embodiment preferable for utilizing efficiently power of the laser chip in dealing with two wavelengths accompanied by CD-R recording such as DVD-ROM and CD-R or DVD-RAM and CD-R.

In the case of using the optical head for DVD-ROM or RAM, as shown in FIG. 5, laser light emitted from a semiconductor laser chip 11 having a wavelength of 650 nm in a laser module 23 is reflected by a beam splitter 26, the reflected light is collimated into parallel rays by a collimator lens 4 and is focused on the record face of an optical disk 8 having a thickness of 0.6 mm of DVD by a focus lens 27. In the meantime, in the case of using the optical head for CD-R, as shown in FIG. 6, laser beam emitted from a semiconductor laser chip 25 having a wavelength of 780 nm for CD-R of a laser diode 24 passes through the beam splitter 26, is collimated into parallel rays by the collimator lens 4 and is focused on an optical disk 9 having a thickness of 1.2 mm of CD by the focus lens 27. As described above, the correction of the focus position owing to the difference between the plate thicknesses of DVD and CD is made to cope with by the aspherical shape of the focus lens 27. However, CD-R is designed to use only the inner peripheral light and therefore, it is difficult to ensure an optical amount sufficient for recording by CD-R at the optical disk 9. Therefore, as means for providing the optical amount sufficient for CD-R recording, a beam shaping prism 28 is arranged between the laser diode 24 and the beam splitter 26 and the efficiency of utilizing the laser light is promoted by constituting the laser light of CD-R in a circular shape. For example, there is corrected light flux in an elliptical shape of about 10° or 30° in full width half maximum emitted from the semiconductor laser. According to the method, in comparison with a method of constituting an optical output of CD-R laser diode 16 with high power, the condition for use in high temperature is alleviated, promotion of the reliability is achieved and factors of increasing the cost such as a deterioration in function and yield of laser owing to the high powered structure or adoption of a heat sink excellent in thermal conductivity, can be restrained.

Continuing with FIG. 6, reflected light from the optical disk 8 or 9 passes through the focus lens 27, falls on a polarizing diffraction grating 29 to be formed into primary diffracted light. Then the primary diffracted light falls on the collimator lens 4, reflected by the beam splitter 26 and thereafter enters a light receiving element substrate 30 provided in a laser module 23. Further, the reflected light is converted into an electric signal and is outputted at each light receiving portion of a light receiving element.

Figure 7:
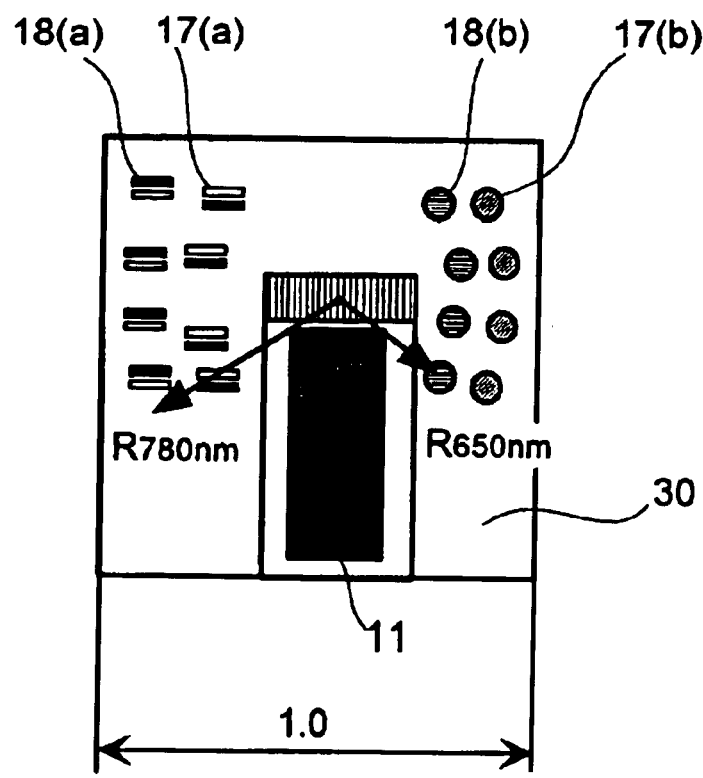
FIG. 7 is a view showing an embodiment of a laser module in FIGS. 5 and 6.

FIG. 7 shows an embodiment of the light receiving element substrate 30 mounted with the laser chip 11. The focal length of the collimator lens is 20 mm, the polarizing diffraction grating pitch is 20 μm. From the above-described Equation (1), when a wavelength of 650 nm, R=660 μm, when a wavelength of 780 nm, R=780 μm, a width of the silicon substrate 30 falls in a range equal to or smaller than 1.0 mm. Therefore the area of the substrate can be restrained to a half or smaller of that in the case of mounting two laser chips and the cost can be reduced.

Further, although according to the embodiment, an explanation has been given by taking an example of a wavelength of 650 nm for DVD-ROM, RAM, a wavelength of 780 nm for CD, CD-R and a wavelength of 410 nm for high density DVD, the embodiment is not limited to wavelengths of 650 nm, 780 nm and 410 nm. For example, it is apparent that the embodiment is applicable for numerical values of 650±10 nm, 780 nm±10 nm, 400±10 nm. As explained in details, according to the embodiment, in the optical head for recording or reproducing optical information recording media having two different wavelengths, there is provided the optical head realizing simplification of fabricating the apparatus, manufacturing individual parts with low cost, strong at a change in temperature and promoting the reliability by reducing the number of parts, and the embodiment contributes to miniaturization and reduction in cost of the optical head for recording or reproducing the optical information recording medium having three different wavelengths.

What is claimed is:

1. An optical head for focusing laser light on an optical information medium and receiving reflected light from the optical information medium comprising:

a first laser emitting component disposed on a first substrate and operable to produce laser light at a first wavelength; and a second laser emitting component disposed on a second substrate and operable to produce laser light at a second wavelength and to detect laser light, the second substrate separate from the first substrate, the second laser emitting component comprising:

a first light receiving element disposed on the second substrate and arranged to receive reflected light of the laser light of the first wavelength; and a second light receiving element disposed on the second substrate and arranged to receive reflected light of the laser light of the second wavelength, wherein the first laser emitting component is further configured to produce laser light of a third wavelength different from the first wavelength and different from the second wavelength, wherein the second laser emitting component further comprises a third receiving element disposed on the second substrate to receive reflected light of the laser light of the third wavelength.

2. The optical head of claim 1 wherein the first wavelength is different from the second wavelength.

3. The optical head of claim 1 wherein the second wavelength is about 410 nanometers.

4. The optical head of claim 3 wherein the first wavelength is about 650 nanometers and the third wavelength is about 780 nanometers.

5. An optical head for focusing laser light on an optical information medium and receiving reflected light from the optical information medium comprising:

a first laser emitting component disposed on a first substrate and operable to produce laser light at a first wavelength; and a second laser emitting component disposed on a second substrate and operable to produce laser light at a second wavelength and to detect laser light, the second substrate separate from the first substrate, the second laser emitting component comprising:

a first light receiving element disposed on the second substrate and arranged to receive reflected light of the laser light of the first wavelength; and a second light receiving element disposed on the second substrate and arranged to receive reflected light of the laser light of the second wavelength, wherein the second laser emitting component is further configured to produce laser light of a third wavelength different from the first wavelength and different from the second wavelength, and wherein the second laser emitting component further comprises a third receiving element disposed on the second substrate to receive reflected light of the laser light of the third wavelength.

6. An optical head for directing laser light to an optical information medium and for receiving reflected laser light from the optical information medium, comprising:

a laser chip for emitting a first beam of light at a first wavelength, the laser diode disposed on a first substrate;

a laser module comprising a second substrate separate from the first substrate, the laser module for emitting at least second beam of light at a second wavelength, the laser module further having a plurality of receiving elements disposed on the second substrate;

a beam splitter to guide the first and the second beams to the optical information medium; and a focus lens to focus the first and second beams onto the optical information medium, thereby producing reflected light from the optical information medium, the beam splitter guiding the reflected light to the receiving elements of the laser module, wherein the laser chip is configured to selectively produce the first beam of light at the first wavelength and at a third wavelength, wherein the beam splitter is disposed such that an optical axis of the first beam of light is substantially in alignment with an optical axis of the second beam of light.

7. An optical head for directing laser light to an optical information medium and for receiving reflected laser light from the optical information medium, comprising:

a laser chip for emitting a first beam of light at a first wavelength, the laser diode disposed on a first substrate;

a laser module comprising a second substrate separate from the first substrate, the laser module for emitting at least second beam of light at a second wavelength, the laser module further having a plurality of receiving elements disposed on the second substrate;

a beam splitter to guide the first and the second beams to the optical information medium; and a focus lens to focus the first and second beams onto the optical information medium, thereby producing reflected light from the optical information medium, the beam splitter guiding the reflected light to the receiving elements of the laser module, wherein the laser module is configured to selectively produce the second beam light at the second wavelength and at a third wavelength, wherein the beam splitter is disposed at a location such that an optical axis of the first beam of light is substantially aligned with an optical axis of the second beam of light.

8. The optical head of claim 7 wherein the laser module comprises a first laser chip and a second laser chip disposed on the second substrate.

9. The optical head of claim 8 wherein the laser chip is configured to produce the first beam of light at only the first wavelength.

10. The optical head of claim 6 further comprising a beam shaping prism disposed between the laser diode and the beam splitter.

11. The optical head of claim 5 wherein the first wavelength is different from the second wavelength.

12. The optical head of claim 5 wherein the second wavelength is about 410 nanometers.

13. The optical head of claim 5 wherein the first wavelength is about 650 nanometers and the third wavelength is about 780 nanometers.

* * * * *